United States Patent [19]
Frost

[11] Patent Number: 6,022,063
[45] Date of Patent: Feb. 8, 2000

[54] VEHICLE WINDOWS

[75] Inventor: Mark Robert Frost, Chorley, United Kingdom

[73] Assignee: Pilkington PLC, St. Helens, United Kingdom

[21] Appl. No.: 08/957,592

[22] Filed: Oct. 24, 1997

[30] Foreign Application Priority Data

Oct. 26, 1996 [GB] United Kingdom .................... 9622337

[51] Int. Cl.⁷ ....................................................... B60J 1/02
[52] U.S. Cl. ................. 296/96.21; 296/84.1; 296/146.15; 52/208
[58] Field of Search ............................. 296/146.1, 146.15, 296/84.1, 85, 90, 93, 96.21, 201; 52/208, 204.591, 204.62

[56] References Cited

U.S. PATENT DOCUMENTS

| | | | |
|---|---|---|---|
| 4,910,071 | 3/1990 | Kunert | 296/84.1 X |
| 4,938,521 | 7/1990 | Kunert | 296/96.21 |
| 5,137,770 | 8/1992 | Rothe et al. | 296/84.1 X |
| 5,149,168 | 9/1992 | Yada et al. | |
| 5,261,718 | 11/1993 | Ohlenforst et al. | 296/96.21 X |
| 5,316,829 | 5/1994 | Cordes et al. | 296/84.1 X |
| 5,443,673 | 8/1995 | Fisher et al | 296/84.1 X |
| 5,519,979 | 5/1996 | Kuner et al. | 296/146.15 X |
| 5,558,387 | 9/1996 | Sumida et al. | 296/96.21 X |

FOREIGN PATENT DOCUMENTS

| | | |
|---|---|---|
| 0 371 810 | 6/1990 | European Pat. Off. . |
| 952029 | 3/1964 | United Kingdom . |
| 2 147 244 | 5/1985 | United Kingdom . |

OTHER PUBLICATIONS

Patent Abstracts of Japan, vol. 95, No. 4; May 31, 1995; Publication No. 07017242 dated Jan. 20, 1995; Tokai Kogyo KK; "Window Device For Automobile".

*Primary Examiner*—D. Glenn Dayoan
*Assistant Examiner*—Jason Morrow
*Attorney, Agent, or Firm*—Marshall & Melhorn

[57] ABSTRACT

A vehicle window has a polymer profile extending along at least a substantial part of one edge of the window, the profile adhering to the inner face of the window and projecting from the inner face, and at least one polymeric distance piece which also adheres to the inner face of the window and is spaced from the profile along the peripheral margin of the window. The polymer profile and at least one polymeric distance pieces space the inner face of the window from the surface of the vehicle bodywork when the window is bonded in position in the vehicle body.

21 Claims, 3 Drawing Sheets

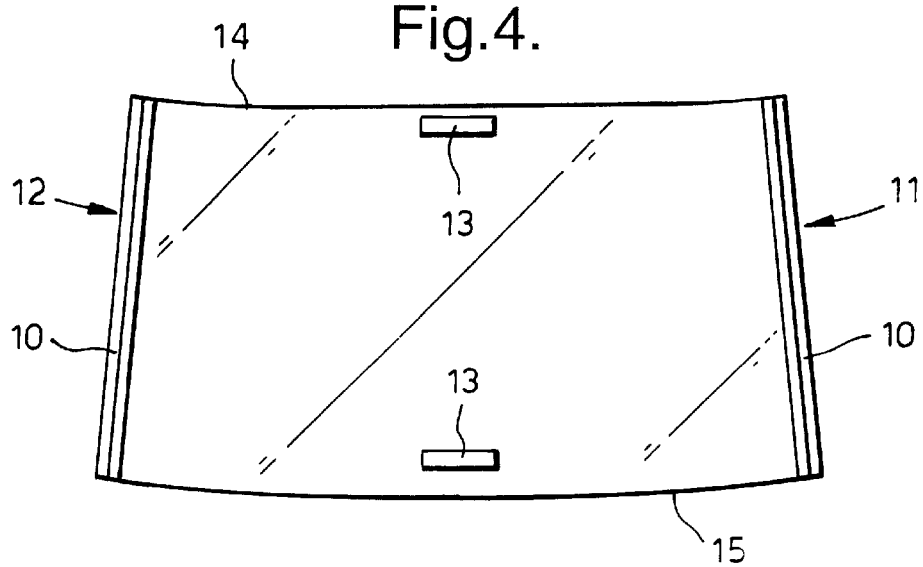
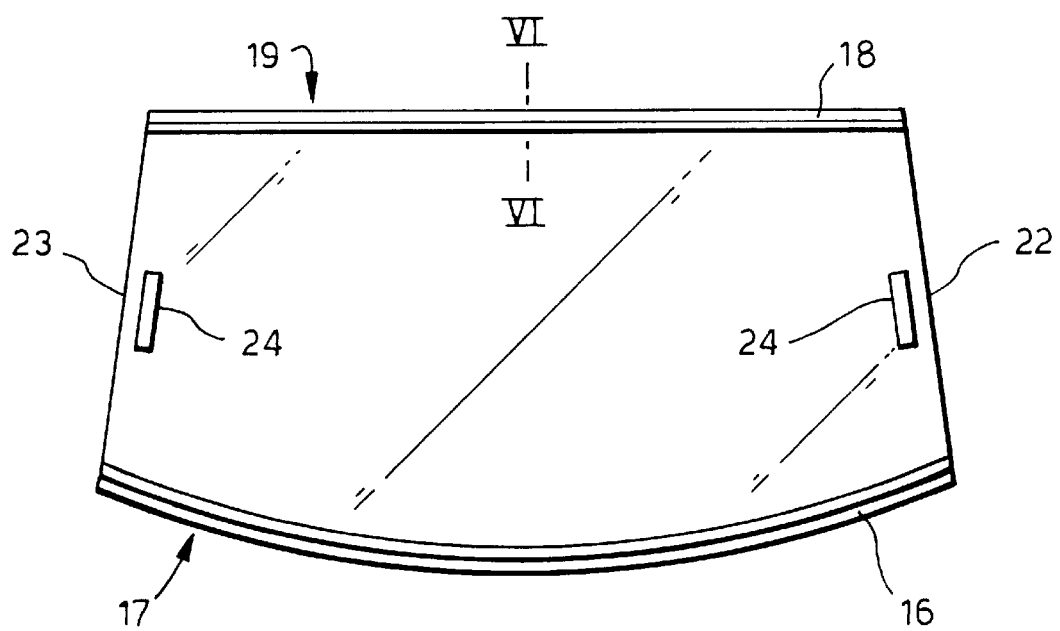
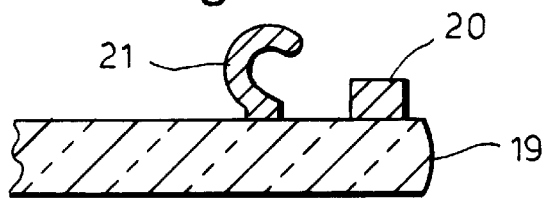

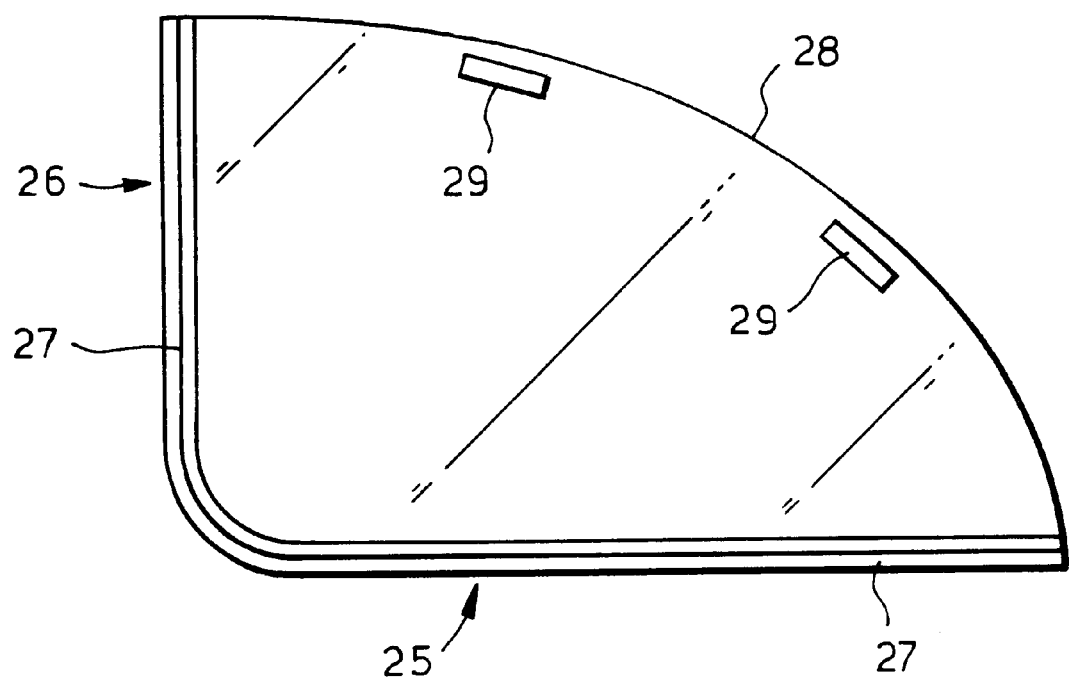

VEHICLE WINDOWS

BACKGROUND OF THE INVENTION

The invention relates to vehicle windows, and especially to vehicle windows provided with a polymer profile on or adjacent at least one edge thereof.

Traditionally, fixed (i.e. non-opening) vehicle windows were glazed using a gasket which both fitted over the edge of the glass to hold it in position and engaged the bodywork of the vehicle. Such gaskets typically had an "H" section with the glass fitting into one recess of the "H" and the opposed recess of the "H" section engaged over a metal flange formed in the vehicle bodywork and extending around the periphery of the window aperture.

More recently, it has been common to glaze fixed vehicle windows adhesively, using a modern adhesive to bond the window to the metal bodywork. In this way, a rigid bond can be formed between window and body, with the window supplementing the strength and stiffness of the vehicle body. To provide an aesthetically pleasing trim, polymer profiles have been bonded to the glass to form a frame around the periphery of the window, with the adhesive used to bond the window to the car applied between the vehicle body and the polymer profile. More recently, it has been proposed to apply the adhesive directly between the vehicle body and the glass surface immediately inside the frame around the window formed by the polymer profile.

While the polymer profiles used in each bonded glazing system may be pre-formed and then bonded to the window surface, they have commonly been produced in situ on the glass either by encapsulation (a process in which the window is placed in a mold which defines the required shape for the polymer profile around the periphery of the glass, and the required solid polymer precursor introduced into the mold cavity in liquid form and cured in situ on the glass), or by extrusion from suitable shaped nozzle which is advanced around the periphery of the window to form the required frame.

The polymeric profile frames bonded to the vehicle window may serve a variety of functions. For example, in addition to (optionally) providing a "bed" on the glass to receive adhesive for bonding the glazing to the car, they may include inner and/or outer dams for limiting the spread of such adhesive, and distance elements for controlling the distance between the internal surface of the window and the opposing surface of the vehicle bodywork to which the window is to be bonded by adhesive. The frame may project beyond the edge of the glass into contact with vehicle bodywork opposing the edge face of the glass, thereby positioning the window positively within the aperture (see, for example, EP 0121 480A, FIG. 3, and EP 0 545 896B).

However, providing a polymeric profile in the form of a frame around the periphery of the window requires significant quantities of polymer material and, if the frame is provided by direct extrusion of the polymer material onto the surface of the window, requires rectification of the joint where the frame is completed, which is liable to be a time-consuming and hence expensive process.

SUMMARY OF THE INVENTION

It has now been found that the important advantages of the prior art profile frames may be achieved without using a frame, but by providing a polymer profile along one or more, e.g. two, edges of the window with one or more polymeric distance pieces spaced from said profile along the peripheral margin of the window.

According to the present invention, there is provided a vehicle window provided with a polymer profile extending along at least a substantial part of at least one edge of the window and adhering to the inner face thereof, said profile projecting from the inner face of the window, and at least one polymeric distance piece adhered to the inner face of the vehicle window, spaced from said profile along the peripheral margin of the window, the polymer profile(s) and distance piece(s) providing means for spacing the inner face of the window from the opposed surface of the vehicle bodywork when the window is bonded in position in the vehicle body. The profile preferably extends along the full length, or substantially the full length, of the respective edge of the window but in some circumstances a smaller length may be desirable or acceptable.

Preferably the profile along at least one edge of the window projects beyond that edge. The projection of the profile beyond the edge of the window may be shaped to engage a surface of the vehicle body opposed to the edge face of the glass, and the profile may serve to locate the window (in at least one direction) within the aperture in the vehicle. The profile may also serve as a dust/weather seal between the edge of the glass and the adjacent bodywork.

The profile may be applied along at least the lower edge of the window, so it serves to support the window in the required position. When the profile is applied along two opposed edges, the profile may be the same or different on the two opposed edges, depending on the position and application of the window. When the profile is applied along two adjacent edges, the profile is preferably the same on those two edges and is preferably continuous along those edges and round the corner between them.

The number and location of polymeric distance pieces used will depend on the shape and dimensions of the window. Usually at least one polymeric distance piece will be used on each edge of the window not provided with a polymeric profile extending along the edge, although longer edges may require two or more distance pieces and it may be unnecessary to provide any distance pieces along shorter edges.

One or more of the distance pieces may be shaped to co-operate with features of the vehicle body to locate the window in position within the window aperture.

BRIEF DESCRIPTION OF THE DRAWINGS

In order that the invention may be better understood, embodiments thereof will now be described by way of illustration and example with reference to the accompanying drawings, in which:

FIG. 4 is a schematic representation of a vehicle window having identical profiles along two opposed edges, FIG. 5 is a schematic representation of a vehicle window having different profiles along two opposed edges, FIG. 6 is a schematic section along the line VI—VI in FIG. 5, and FIG. 7 is a schematic representation of a vehicle window having identical profiles along two adjacent edges.

DETAILED DESCRIPTION OF THE PREFERRED EMBODIMENTS OF THE INVENTION

Figure 1:
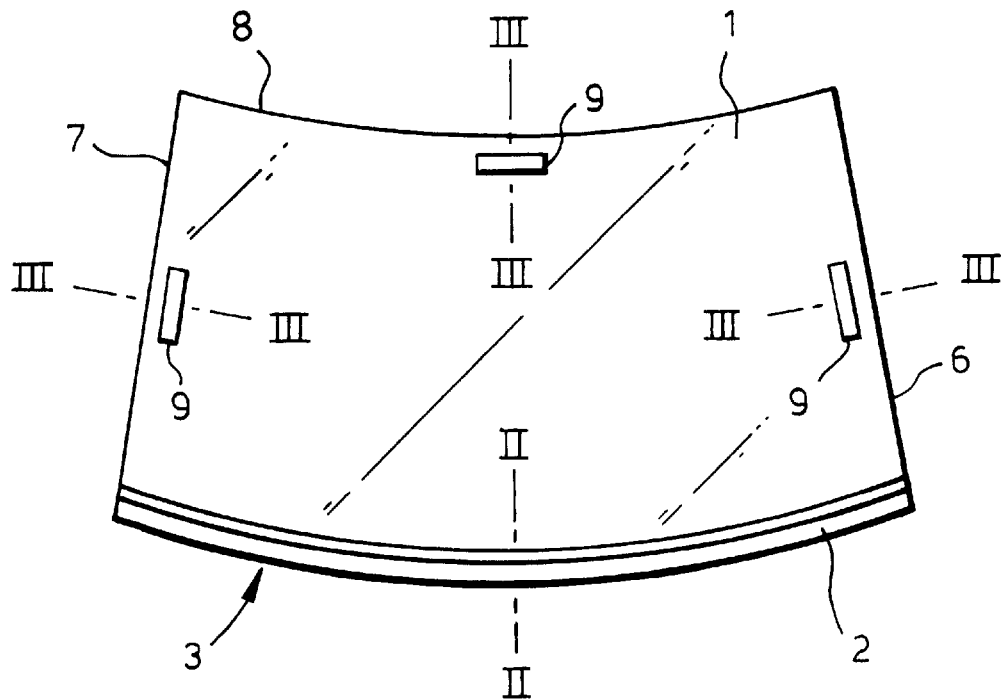
FIG. 1 is a schematic representation of a vehicle window having a profile along one edge.
Figure 2:
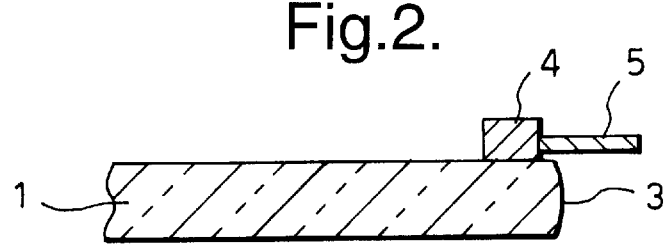
FIG. 2 is a schematic section along the lines II—II in FIG. 1.
Figure 3:
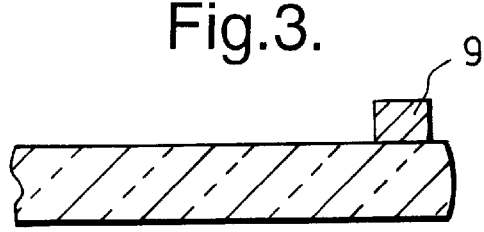
FIG. 3 is a schematic section along the lines III—III in FIG. 1.

Referring first to FIG. 1, there is shown a vehicle window comprising a glass pane 1 (which may be laminated or toughened) having a polymer profile 2 extending along its bottom or lower edge 3. The cross-sectional form of the profile 2 is shown in FIG. 2 and comprises a block-like element 4 and a lip 5 which projects beyond the edge 3 of the window. This projection of the profile is shaped to engage a surface opposed to the edge face of the window when installed in the vehicle and in particular is shaped and dimensioned to support the window in the required position within the window aperture in the vehicle bodywork. The profile adheres to and projects from the inner face of the window and is formed by extrusion in situ onto the window in a manner known per se. In the FIG. 1 embodiment the two side edges 6 and 7 and the top or upper edge 8 of the window do not carry a polymer profile like the lower edge 3 but have a polymeric distance piece 9 located about half-way along the length of the respective side. These distance pieces have a cross-sectional form as shown in FIG. 3 which is similar to that of the block element 4 of the polymer profile 2. However, the distance pieces 9 are relatively short in length occupying only a small proportion of the length of the side near which they are located. The distance pieces 9 are adhered to and project from the inner face of the inner face of the vehicle window 1 and are formed by extrusion in situ on to the window in a manner known per se. The distance pieces 9, or at least one of them, are designed to cooperate with a feature in the vehicle body to position the window within the window aperture. It will be seen that the distance pieces 9 are spaced from the profile 2 along the peripheral margin of the window and the profile 2 and distance pieces 9 provide means for spacing the inner face of the window from the opposed surface of the vehicle bodywork when the window is bonded in position in the vehicle body.

The embodiment shown in FIG. 4 has a polymer profile 10 extending along each of the side edges 11 and 12 of the window, the profiles being identical and of the same form as shown in FIG. 2. A polymeric distance piece 13, of the same form as shown in FIG. 3, is located mid-way along each of the respective upper and lower edges 14 and 15 of the vehicle window.

The embodiment shown in FIG. 5 has a polymer profile 16 extending along the lower and bottom edge 17 of the vehicle window and a polymer profile 18 extending along the upper edge 19. In this case, however, the respective profiles 16 and 18 are different. The profile 16 is a cross-sectional form as shown in FIG. 2 and already described but the profile 18 is of cross-sectional form as shown in FIG. 6 having a block-like element 20 and a curved element 21 both of which project from the inner surface, i.e. inwardly form the edge of the window (or upwardly as viewed in FIG. 6). The side edges 22 and 23 of the window have respective distance pieces 24 as already described in relation to the FIG. 1 embodiment.

FIG. 7 shows an effectively three sided window embodiment as distinct from the four sided windows of FIGS. 1, 4 and 5. In the FIG. 7 embodiment the lower edge 25 and the side edge 26 have a polymer profile 27 which is identical, of the same form as shown in FIG. 2, along each of those edges and actually running continuous round the corner between those edges. The third side 28 of the window is curved and two polymeric distance pieces 29 are provided at spaced locations along that edge. The form of the distance pieces is as already described in relation to the previous embodiments.

It will be seen that in each of the embodiments specifically described about there is at least one distance piece on each edge of the window not provided with a polymer profile extending along that edge. The polymer profiles and the distance pieces are on the inner face only of the glass pane. It will be understood, however, that these embodiments are described by way of illustration and example and further embodiments of the invention will be readily apparent to those skilled in the art. It will be understood that the window edges may be straight or curved and that the particular shapes of window shown in the drawings are not intended to be limitative and that the invention can find application in any suitable vehicle window, including windscreens, backlights, sidelights and rooflights.

It will further be appreciated by those skilled in the art that the present invention can provide various advantages over other techniques. Notably less polymer material is required than if a profile is applied round the full periphery and/or on both sides of the window edge, thereby saving expense. Further, the need to spend time on jointing, or rectification of the joint where a full frame is applied, is avoided and instead a simple trimming operation, which may for example be performed by a robot, can be applied to the profile and/or distance piece ends.

I claim:

1. A vehicle window provided with a polymer profile extending along at least a substantial part of at least one edge of the window and adhering to the inner face thereof, said profile projecting from the inner face of the window, and at least one polymeric distance piece, adhered to the inner face of the vehicle window, spaced along the peripheral margin of the window from said profile and separate from said profile, the polymer profile(s) and distance piece(s) providing means for spacing the inner face of the window from the opposed surface of the vehicle bodywork when the window is bonded in position in the vehicle body.

2. A vehicle window as claimed in claim 1 in which the profile along at least one edge projects beyond the edge of the window.

3. A vehicle window as claimed in claim 2 wherein the projection of the profile beyond the edge of the window is shaped to engage a surface opposed to the edge face of the window.

4. A vehicle window as claimed in claim 2 wherein the projection of the profile beyond the edge of the window is shaped and dimensioned to support the window in the required position within the window aperture.

5. A vehicle window as claimed in claim 1 wherein the profile extends along the lower edge of the window.

6. A vehicle window as claimed in claim 1 wherein the polymer profile is formed by extrusion in situ onto the window.

7. A vehicle window as claimed in claim 1 including at least one polymeric distance piece on each edge of the window not provided with a polymer profile extending along that edge.

8. A vehicle window as claimed in claim 1 whereon the or each polymeric distance piece is formed by extrusion in situ on to the window.

9. A vehicle window as claimed in claim 1 wherein at least one spaced polymeric distance piece is designed to co-operate with a feature in the vehicle body to position the window within the window aperture.

10. A vehicle window as claimed in claim 1 in which the same profile is applied along two opposed edges.

11. A vehicle window as claimed in claim 1 in which different respective profiles are applied along two opposed edges.

12. A vehicle window as claimed in claim 1 in which the same profile is applied along two adjacent edges.

13. A vehicle window as claimed in claim 12 in which a continuous profile is applied along the two adjacent edges and round the comer between them.

14. A vehicle window provided with a polymer profile extending along substantial parts of at least two edges of the window and adhering to the inner face thereof, said profile projecting from the inner face of the window, and at least one polymeric distance piece, adhered to the inner face of the vehicle window, spaced along the peripheral margin of the window from said profile and separate from said profile, the polymer profile(s) and distance piece(s) providing means for spacing the inner face of the window from the opposed surface of the vehicle bodywork when the window is bonded in position in the vehicle body.

15. A vehicle window as claimed in claim 14 in which the same profile is applied along two opposed edges.

16. A vehicle windows as claimed in claim 14 in which different respective profiles are applied along two opposed edges.

17. A vehicle window as claimed in claim 14 in which the same profile is applied along two adjacent edges.

18. A vehicle window as claimed in claim 17 in which a continuous profile is applied along the two adjacent edges and round the corner between them.

19. A vehicle window as claimed in claim 14 in which the profile along at least one edge projects beyond the edge of the window.

20. A vehicle window as claimed in claim 19 wherein the projection of the profile beyond the edge of the window is shaped to engage a surface opposed to the edge face of the window.

21. A vehicle window having at least one edge provided with a polymer profile extending along at least a substantial part thereof and adhering to an inner face of the window, and at least one edge not provided with a polymer profile, wherein each edge not provided with a polymer profile is provided with at least one polymeric distance piece adhered to the inner face of the window, the polymer profile(s) and distance piece(s) providing means for spacing the inner face of the window from the opposed surface of the vehicle bodywork when the window is bonded in position in the vehicle body.

* * * * *